No. 685,113. Patented Oct. 22, 1901.
J. DARLING.
VEHICLE SPINDLE.
(Application filed July 31, 1901.)
(No Model.)

WITNESSES:
Jos. A. Ryan
Perry B. Turpin

INVENTOR
Joseph Darling.
BY Munn & Co.
ATTORNEYS

UNITED STATES PATENT OFFICE.

JOSEPH DARLING, OF CHICORA, PENNSYLVANIA.

VEHICLE-SPINDLE.

SPECIFICATION forming part of Letters Patent No. 685,113, dated October 22, 1901.

Application filed July 31, 1901. Serial No. 70,405. (No model.)

*To all whom it may concern:*

Be it known that I, JOSEPH DARLING, a citizen of the United States, residing at Chicora, in the county of Butler and State of Pennsylvania, have made certain new and useful Improvements in Vehicle-Spindles, of which the following is a specification.

My invention is an improvement in devices for securing nuts upon the outer ends of spindles of vehicle-axles whereby to prevent said nuts from accidentally turning off, prevent them from being turned too tightly upon the spindle, and enable them to be secured in any desired adjustment upon the spindle; and the invention consists in certain novel constructions and combinations of parts, as will be hereinafter described and claimed.

Figure 1:
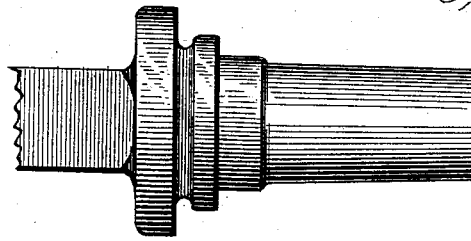
Figure 2:
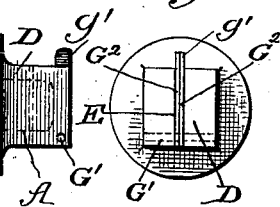
Figure 3:
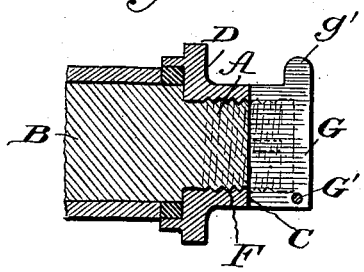
Figure 4:
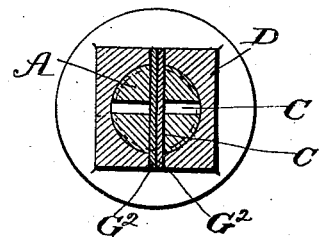
Figures 5, 6:
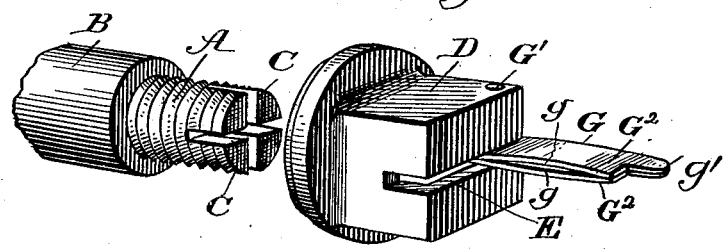

In the drawings, Figure 1 is a side view of my invention as in use. Fig. 2 is an end view thereof. Fig. 3 is a detail longitudinal section drawn through a portion of the spindle and through the nut alongside the locking device carried by the nut. Fig. 4 is a detail cross-sectional view on about line 4 4 of Fig. 3. Fig. 5 is a detail perspective view of the slotted end of the spindle. Fig. 6 is a detail perspective view of the nut with the locking-key opened.

In carrying out my invention I provide in the outer end of the threaded tenon A of the spindle B slots C C, preferably two in number and crossing each other at a right angle and extending inwardly a sufficient distance to receive the key carried by the nut when the latter is turned home.

The nut D may in general respects be of any suitable construction and is provided in its outer end with a transverse slot E, which is extended inwardly far enough to intersect the threaded opening or socket F, formed in the inner end of the nut to turn upon the tenon A, as shown in Fig. 3.

The locking-key G is carried by the nut, is formed to fit in the slot E and one of the slots C when the nut is locked, is pivoted at G' to the nut, so it can swing in and out between the positions shown in Figs. 3 and 6, and is composed of two spring-plates $G^2$ and $G^2$, operating side by side and sprung slightly out of line and apart at their middles at $g$, so the key will bind within the slot E in the nut D when the locking-key is adjusted to locked position, as shown in Fig. 3. In securing this binding operation of the locking-key the plates $G^2$ are deflected between their ends in such manner as to cause them to operate with a spring action to bind within the slots of the nut and spindle.

By preference the pivot G' is arranged at one corner of the locking-key and the nut, so the key when adjusted to locked position, as shown in Fig. 3, will extend entirely across the nut and will lock the spindle throughout the diameter of its threaded tenon. I also form the locking-key so its outer edges will coincide with the outer end and sides of the nut in which the slot E is formed and leave no projection beyond the nut when the nut is locked, except the short projecting tongue $g'$, which is arranged for engagement by a wrench or other tool in order to open the key from the position shown in Fig. 3 to that shown in Fig. 6. It will be understood from the foregoing that the preferred construction of the locking-key includes two separate and independent plates operating side by side and deflected relatively between their ends to secure the binding of the key in the slot of the nut.

It will be noticed, especially in Fig. 6, that the nut is of the cap form usually employed upon vehicle-spindles and that the slot E extends from side to side transversely across the outer closed end of the nut in such manner and to such extent as to intersect the threaded socket in the inner end of the nut.

In operation the locking-key when adjusted to the position shown in Fig. 6 will not interfere with the turning of the nut on or off the spindle. When the nut has been turned to the desired position, the locking-key may be adjusted from the position shown in Fig. 6 to that shown in Fig. 3, in which position it will stand within the slot E and in one of the slots C of the tenon A and will thus positively lock the nut from turning in either direction upon the spindle. When the locking-key is opened, as shown in Fig. 6, it will not in any way interfere with the operation of the wrench in turning the nut on or off the spindle. By enabling the locking of the nut in any position upon the spindle it will be possible to use washers of different thicknesses and to adjust the nut so the spindle will not be heated or the horse be overworked and so the nut cannot accidentally loosen or be turned up too tight on the washers in driving the vehicle.

In case of breakage or other injury to the key another one can readily be inserted or the nut can be used without a key in the ordinary way. By using the crossed slots C, as shown in Fig. 5, the nut can be secured at any quarter-turn, and by arranging the slots C vertically and horizontally, as shown in Fig. 5, the location of the slots can always be easily determined when the nut is on the spindle.

Having thus described my invention, what I claim, and desire to secure by Letters Patent, is—

1. The combination substantially as herein described of the spindle having the threaded tenon slotted in its outer end, the cap-nut provided in its inner side with a socket to fit the threaded tenon, and having in its outer end a transversely-extending slot intersecting the inner socket, and extending from side to side of the end of the nut, and the locking-key composed of two independent similar plates fitted side by side and deflected apart at their middles, and pivoted at one end to the nut and arranged to be adjusted on said pivot into and out of the slot of the nut, and formed when adjusted in said slot to coincide with the faces of the nut intersected by the slot throughout the major portion of the said key, the latter being provided at its swinging end with a tongue to project beyond the nut in the closed position of the key for engagement by an operating-tool, substantially as set forth.

2. The combination of the spindle having the threaded tenon slotted in its outer end, and the nut provided in its inner end with the socket to fit said tenon and in its outer end with the transverse slot intersecting the inner socket, and the key pivoted at one end to the nut and arranged to be adjusted into and out of the slot therein, said key being deflected between its ends, whereby it will be caused to bind within the slot when adjusted to locked position, substantially as set forth.

3. The combination of the nut socketed in its inner side to fit the spindle-tenon and provided in its outer side with a transverse slot extending from side to side and intersecting the socket and the key pivoted at one end to the nut within the slot, and arranged to be turned into said slot when adjusted to locked position and composed of two similar plates fitted side by side and deflected apart at their middles and provided at their swinging ends with projecting portions forming a tongue by which to release the key from locked position, substantially as set forth.

4. A cap-nut for vehicle-spindles, provided in its outer end with a transverse slot intersecting the threaded opening for the threaded portion of the spindle and provided with a locking-key composed of two separate and independent plates, operating side by side and deflected relatively between their ends, whereby they will bind by a springing action within the slot of the nut, and pivoted to the nut and arranged to operate within the slot thereof, substantially as set forth.

5. A cap-nut for vehicle-spindles closed at its outer end and provided in its inner end with a socket to turn upon the tenon of the spindle, and provided in its outer closed end with a transverse slot which intersects the inner socket of the nut, and extends from side to side of the latter and the locking-key pivoted at one corner to the nut and operating within the slot thereof and arranged at its pivoted end and outer side to coincide with the corresponding faces of the nut in the locked position of the key, and provided at its swinging end with a projecting tongue for engagement by a suitable operating-tool, substantially as set forth.

JOSEPH DARLING.

Witnesses:
J. C. GAISFORD,
G. D. THOMAS.